United States Patent [19]

De Villepoix et al.

[11] Patent Number: 5,423,557
[45] Date of Patent: Jun. 13, 1995

[54] FLEXIBLE JOINT WITH JACKET

[75] Inventors: Raymond De Villepoix, Donzere; Claude Abbes, Saint Etienne; Robert Besson, Angers; Christian Rouaud, Bourg Saint Andeol; Michel Tressol, St Priest en Jarez, all of France

[73] Assignee: Commissariat A L'Energie Atomique, Paris, France

[21] Appl. No.: 72,519

[22] Filed: Jun. 4, 1993

[30] Foreign Application Priority Data

Jun. 5, 1992 [FR] France ............... 92 06843

[51] Int. Cl.⁶ ............................................. F16J 15/16
[52] U.S. Cl. .................................. 277/164; 277/201; 277/236
[58] Field of Search ............. 277/164, 201, 202, 236, 277/152, 183, 184

[56] References Cited

U.S. PATENT DOCUMENTS

| | | | |
|---|---|---|---|
| 2,177,441 | 10/1939 | Pesarese | 277/152 |
| 2,761,442 | 9/1956 | Emerson | 277/164 |
| 3,268,984 | 8/1966 | Kupchick | 29/149.5 |
| 3,588,131 | 6/1971 | Nicholson | 277/236 X |
| 3,820,799 | 6/1974 | Abbes et al. | 277/164 |
| 3,917,294 | 11/1975 | Abbes et al. | 277/236 X |
| 4,188,037 | 2/1980 | Abbes et al. | 277/164 X |
| 4,381,869 | 5/1983 | Abbes et al. | 277/164 X |
| 4,445,694 | 5/1984 | Flaherty | 277/236 X |
| 4,603,892 | 8/1986 | Abbes et al. | 277/236 X |
| 5,066,024 | 11/1991 | Reisinger et al. | 277/184 X |

FOREIGN PATENT DOCUMENTS

| | | |
|---|---|---|
| 161149 | 11/1985 | European Pat. Off. . |
| 2224029 | 10/1974 | France . |
| 3907614 | 9/1990 | Germany . |
| 1437051 | 5/1976 | United Kingdom ........ 277/236 |

Primary Examiner—William A. Cuchlinski, Jr.
Assistant Examiner—John J. Beres
Attorney, Agent, or Firm—Michael N. Meller

[57] ABSTRACT

A flexible joint to ensure static imperviousness between one external medium and one internal medium, and dynamic imperviousness between the two portions of the internal medium. The joint includes a central core in the form of a spring surrounded by three casings, the second casing, with the aid of a jacket of overlapping surfaces ensures the dynamic imperviousness between the mobile element and the fixed element. The external casing ensures static imperviousness between the two portions of the fixed element.

9 Claims, 2 Drawing Sheets

FLEXIBLE JOINT WITH JACKET

FIELD OF THE INVENTION

The invention concerns the imperviousness between at least two volumes where there are different pressures and temperatures. This applies to certain portions of turbo-propeller engines used on civil and military aircraft, especially to control the flowrate of leaks between the various stages of the vanes or to allow for deformation of elements in the hot portions of these turbo-propeller engines. This type of joint is also provided to constitute a solution with regard to problems of heating of the control surfaces of the future "HERMES" spatial aircraft at the time it re-enters the dense layers of the atmosphere.

BACKGROUND OF THE INVENTION

Joints are widely used to separate two volumes in which different fluids exist with different temperatures and under different pressures. On the other hand, it is more difficult to provide this imperviousness when the various walls separating these two volumes have relative movements with respect to each other. This is the case between the rotor and stator of a turbo-propeller engine concerning the various stages of the vanes of a high pressure compressor. In fact, the extremity of the blades of the stator almost touches the periphery of the rotor. It is then useful in managing imperviousness allowing for a limited flow of fluid between the two separated volumes, that is ensuring a significant head loss. Secondly, in this case, the relative speed between the fixed and mobile elements is extremely considerable.

In other cases, it may prove advantageous to almost obtain a contact between the fixed and mobile portions so that the joint serves as a filter by retaining certain impurities tending to move from one volume into the other. This occurs with relative low speeds between the fixed and mobile elements.

However, these joints are not studied to firstly provide static imperviousness between one of the two volumes and a third different volume. In fact, this is often the case when the static housing is composed of two flanges compressing a slightly elastic element, such as a dynamic joint ensuring imperviousness between two internal volumes between said housing and one internal rotor.

The object of the invention is to provide a flexible joint ensuring both static imperviousness between two first mediums and dynamic or semi-dynamic imperviousness between one of the two first mediums and a third medium.

SUMMARY OF THE INVENTION

To this effect, the main object of the invention is to provide a flexible joint ensuring imperviousness between two volumes where there are different pressures and including:
  an elastic core,
    one first casing placed around the core so as to ensure imperviousness between one first medium and the two volumes, and
    a second casing placed in the first casing and around the core and whose section has the shape of an unclosed cavity being extended into the unclosed portion by a jacket formed of two flat surfaces parallel to each other and perpendicular or parallel to the axis of the core and by the extremity from which imperviousness is ensured between one second medium and one third medium, both delimited by one fixed element and one mobile element and constituting the two volumes. Thus, the two faces of the second casing are called a "jacket".

Generally speaking, the core is elastic and constituted by a helical spring, the casings each having a cylindrical section.

The main embodiment of the invention provides for the use of a third casing placed around the spring in the second casing so as to keep the spring in position and prevent the second casing from penetrating between the spires of the spring.

One main embodiment of the joint of the invention is when the joint is annular, the casings being toric.

In this case, it is preferable that the third casing is made of ductile metal and has the shape of a toric surface whose generating circle does not close onto itself.

The second casing is preferably made of metal, but is more flexible than the first and third casings.

In this case, the second casing is made of a synthetic or mineral material.

The first casing is preferably made of a ductile metal and has the shape of a toric surface whose generating circle does not close onto itself and is extended by two circular flat surfaces parallel to each other and perpendicular or parallel to the axis of the core but shorter than the parallel surfaces of the jacket of the second casing.

BRIEF DESCRIPTION OF THE DRAWINGS

The invention and its various technical characteristics shall be more readily understood from a reading of the following description accompanied by several figures, namely.

DETAILED DESCRIPTION OF THE PREFERRED EMBODIMENTS

Figure 1:
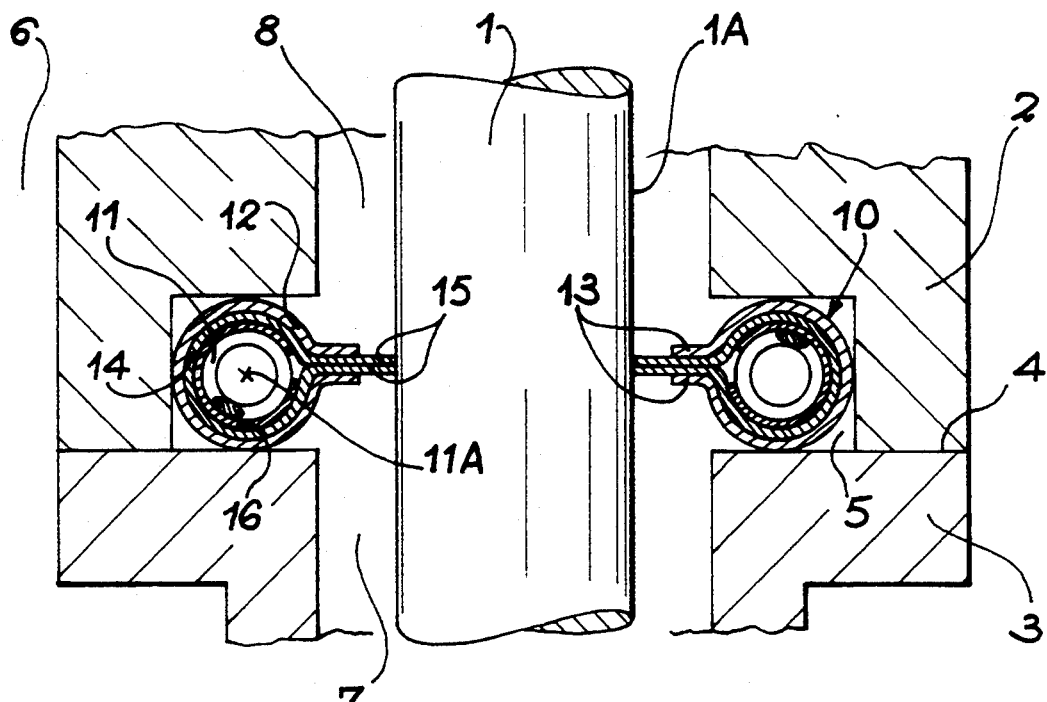
FIG. 1 is a cutaway view of the preferred embodiment of the joint of the invention.

In the embodiment of FIG. 1, three different mediums are shown, that is one first external medium 6 and one internal medium. This second medium further needs to be technologically split into two volumes, namely one second internal medium 7 and one third internal medium 8. Furthermore, these various mediums are delimited by a fixed housing constituted by two portions 2 and 3 which are contiguous along a parting plane 4 and by one mobile element 1 placed inside the housing. The joint 10 of the invention is mainly used to imperviously separate the two internal mediums, that is the second medium 7 and the third medium 8. A second function of this joint 10 is to provide imperviousness between the two portions 2 and 3 of the housing at the level of the parting plane 4. The imperviousness to be provided between the two internal medium 7 and 8 is dynamic, whereas the imperviousness to be provided between the two portions 2 and 3 of the housing at the level of the parting plane 4 is static.

Secondly, the first and second internal mediums 7 and 8 each contain a different fluid, both as regards the nature and the pressure and temperature. Thus, it can be seen that the joint 10 separates two stages in a high pressure compressor of a turbo-propeller engine and that the air is compressed there. The joint may also be bathed in the combustion gases of a motor.

The mobile element 1 may be a shaft or a piston. This means that the relative movement of the mobile element 1 with respect to the housing 2, 3 may be either a translation movement or a rotation movement.

According to the invention, the flexible joint has the following structure. It includes at its center an elastic core 11 with an axis 11A preferably constituted by a helical spring with contiguous spires. In the case of a flexible annular joint, this spring is closed onto itself and, in its idle position, has the shape of a torus, this being the case of the embodiment shown on FIG. 1.

The joint of the invention also includes one first casing 12 placed around the spring 11 constituting the elastic core so as to ensure imperviousness between the first medium 6, that is the external medium, and the other two mediums 7 and 8, namely the internal mediums.

A further main element of the flexible joint of the invention is constituted by a second casing 14 placed in the first casing 12 and around the spring 11. The section of this second casing 14 has the shape of an unclosed cavity extending in a direction perpendicular to the axis 11A of the core in the direction of the shaft 1 by two flat surfaces 15 forming a jacket. These two flat surfaces 15 have a specific length so as to almost touch the external surface 1A of the shaft 1. It is the extremities of these two flat surfaces 15 which ensure imperviousness between the second medium 7 and the third medium 8 around the mobile shaft 1.

Thus, the joint ensures dynamic imperviousness between the fixed and mobile elements and imperviousness between the two portions 2 and 3 of the fixed element.

The embodiment of FIG. 1 provides for the use of a third casing 16 placed around the helical spring 11 constituting the elastic core of the joint so as to keep this spring 11 in the ideal position. In the case of FIG. 1, this ideal position is an annular position around the shaft 1. This third casing 16 also ensures that no impurity or portion of the second casing 14 is able to penetrate between two spires of the spring 11.

The shape of this third casing 16 is that of a toric surface whose generating circle does not close onto itself so as to be able to mount the spring 11 inside said casing. The third casing 16 thus needs to be slightly elastic, but is preferably constituted by an extremely thin of a ductile metal, such as aluminum, silver, copper, nickel, stainless steel, inconel, etc.

The second casing 14 ensuring imperviousness between the two internal mediums 7 and 8 may be of different types. Firstly, it may be metallic and more specifically made of rolled sheet metal, orientated wires joined side by side or of woven wires. It may also be made of a synthetic material or mineral material in the shape of a rolled or moulded sheet, in the shape of orientated wires joined side by side or even in the shape of woven wires. In all these cases, it is adapted to the diameter of the external surface 1A of the shaft 1 via an in situ initial lapping. The two extremities of the two flat surfaces 15 of the jacket may possibly form an internal diameter slightly smaller than the diameter of the external surface 1A of the mobile element when this second casing 14 is made of a woven or fibrous type flexible material.

Like the third casing 16, the first casing 12 may also be made of a rollable ductile metal in the shape of an extremely fine sheet metal with a thickness of several tenths of a millimeter. In the embodiment of FIG. 1, this first casing 12 has the shape of a toric surface whose generating circle does not close onto itself, but on the other hand is extended by two flat surfaces 13 parallel to each other and perpendicular to the axis of the core 11 in the direction of the shaft 1 so as to encompass the two flat surfaces 15 of the jacket. However, the lower extremity of each of the two flat surfaces 13 does not reach the external surface 1A of the mobile element.

The ductility of the metal used to constitute this first casing 12 makes it possible to ensure static imperviousness of the two portions 2 and 3 of the fixed casing by virtue of a slight crushing of this metal. Thus, any possible leaks normally occuring inside the parting plane are thus eliminated.

The flexible joint of the invention is firstly able to ensure imperviousness between the first medium 6 and the set of the second and third mediums 7 and 8, and secondly ensure separation of these second and third mediums 7 and 8 into two zones possessing slightly different physical characteristics. The particular shape of the joint of the invention reduces to maximum the operating play required existing between the mobile element 1 and the fixed element 2, 3.

This joint acts as a filter and retains the impurities in one of the second and third mediums 7 and 8 whilst keeping the other clean.

It makes it possible to reduce to maximum the passage section whilst ensuring a highly significant head loss and by thus limiting the flow of fluid between the second and third mediums 7 and 8, having regard to the pressure differences possibly existing between them.

Finally, it acts as a scraper in cases where slow speeds are involved between the mobile element 1 and the fixed element 2 and 3 whilst keeping the mobile element 1 clean. It protects any possible neighbouring imperviousness members.

The nature of the various essential elements of the annular joint shown on FIG. 1 shall of course be determined by the service and use conditions of the joint, especially the pressure, temperature and nature of the fluids contained in the second and third mediums 7 and 8.

The second casing 14 is in any case more flexible than the first 12 and third 16 casings. Its rigidity must, however, be determined so that the jacket effectively resists the pressure difference between the second and third mediums 7 and 8 without the external surface 1A of the mobile element 1 being damaged by friction.

The annular joint of the invention is not merely limited to the single embodiment described on FIG. 1.

Figure 2:
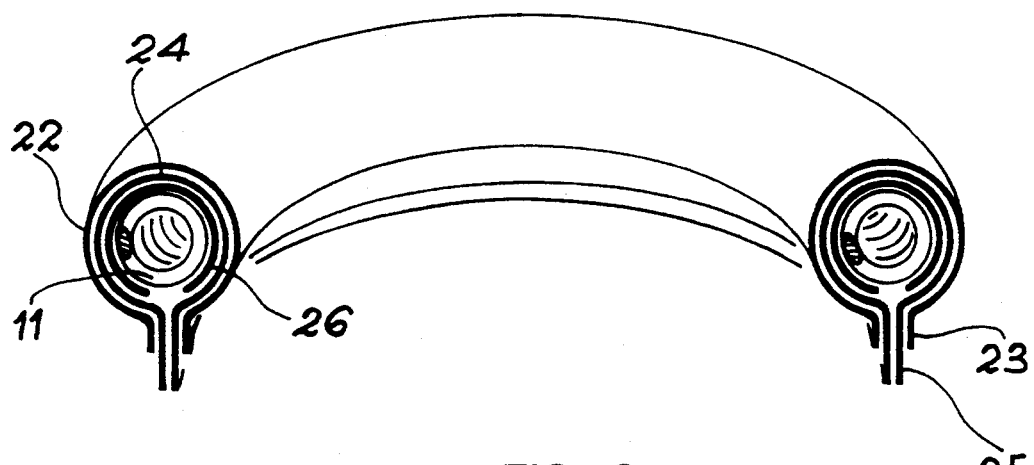
FIG. 2 shows one first embodiment variant of the joint of the invention.

With reference to FIG. 2, it is also possible to use the structure of the joint of the invention for embodying other shapes of joints. In fact, the flat surfaces 23 and 25 of the first and second casings 22 and 24 of this joint are not directed towards the center of revolution of this annular joint. They may be directed in a direction perpendicular to the preceding one so that the extremities of the flat surfaces 25 of the jacket are coplanar for acting on a flat surface which may be the radial surface of an annular shoulder. The structure of this annular joint still includes a central core constituted by a spring 11 around which at least two casings 22 and 24 are placed. A third casing 26 is preferably used.

Figure 3:
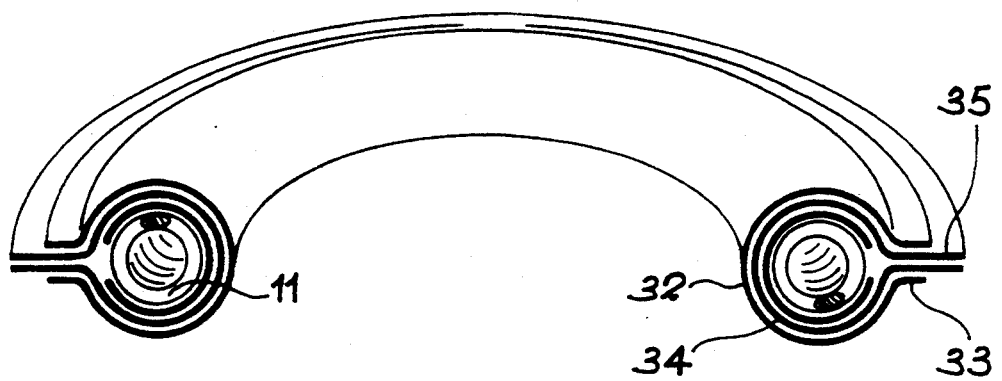
FIG. 3 shows one second embodiment variant of the joint of the invention.

The joint of FIG. 3 still uses the same structure. On the other hand, the flat surfaces 33 and 35 of the first and second casings 32 and 34 of this joint are orientated around the annular joint in a direction opposing that of the flat surfaces of the joint of FIG. 1. This type of joint may therefore be used inside a cylinder whose internal surface is flush with the extremities of the jacket of the second casing 34.

Figure 4:
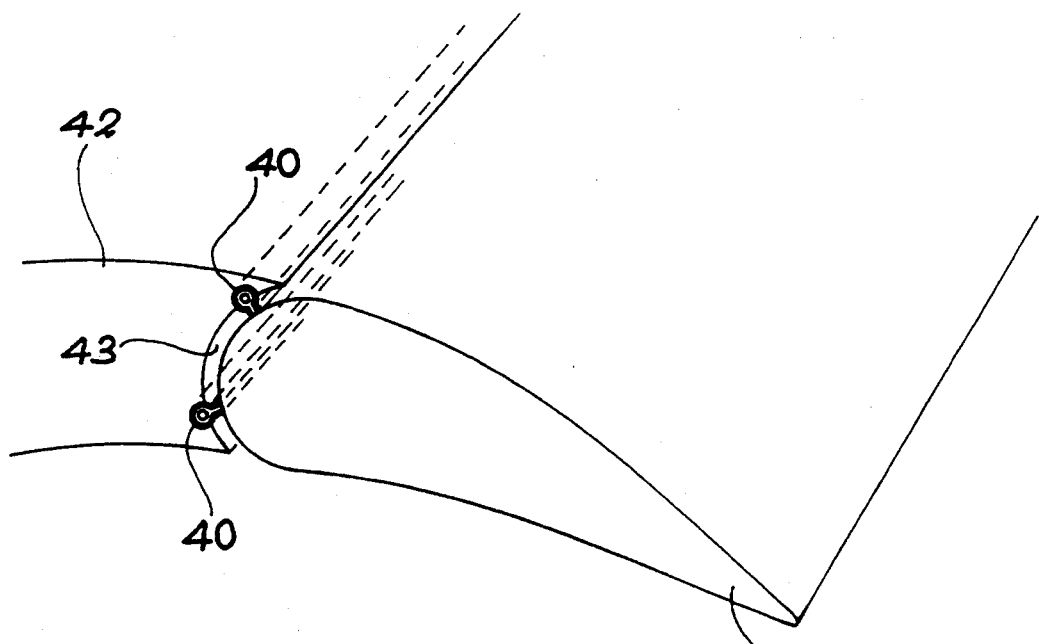
FIG. 4 shows one special use of the joint of the invention.

FIG. 4 shows a case for the special use of the joint of the invention. In this case, the joint is no longer annular and the spring and casings no longer have toric shapes. The joint then no longer has a circular shape but a profile formed of rectilinear and/or any curved portions. In this case, the joint 40 is applied between the control surface 41 and the wing tip 42 of a "HERMES" type space aircraft. Thus, two rectilinear portions of the joint 40 are placed in the gap 43 existing between the mobile control surface 41 and the fixed wing tip 42. This joint 40 is thus adapted to the shape of this gap and thus to the profile of the wing of the aircraft. This joint 40 may limit the temperature of the control surface 41 when the aircraft re-enters the dense layers of the atmosphere. It also limits the passages of air filaments and reduces the rise of temperature due to friction.

What is claimed is:

1. Flexible joint ensuring imperviousness between two volumes where different pressures exist with one of said volumes delimited by a mobile element and the other by an element which is fixed relative to the mobile element comprising:

one elastic core, one first casing partially surrounding the core to form an open gap communicating with said two volumes;

one second casing enclosed by said first casing and partially surrounding said core except for said open gap with said second casing having a cross sectional geometry in the shape of an unclosed cavity and being concentric to said first casing; jacket means extending from said second casing through said open gap to a position adjacent said mobile element for separating said two volumes with said jacket means consisting of two overlapping flat surfaces disposed parallel to one another.

2. Joint according to claim 1, wherein the elastic core consists of a helical spring and with, the first and second casings having a cylindrical cross section.

3. Joint according to claim 2, further comprising one third casing placed around the spring inside the second casing so as to keep the spring in position and to prevent the second casing from penetrating between the spires of the spring.

4. Joint according to claim 3, wherein said spring forms an annular geometry and the casings are toric.

5. Joint according to claim 4, wherein the third casing is made of a ductile metal and has the shape of a toric surface whose generating circle does not close onto itself.

6. Joint according to claim 4, wherein the second casing is metallic but more flexible than the first and third casings.

7. Joint according to claim 4, wherein the second casing is made of a synthetic material.

8. Joint according to claim 4, wherein the second casing is made of a non-metallic material.

9. Joint according to claim 4, wherein the first casing is made of a ductile metal and has the shape of a toric surface whose generating circle does not close onto itself and includes means extending from said toric surface overlapping said flat surfaces extending from said second casing but of shorter dimension thereof.

* * * * *